F. J. GLEASON.
PROCESS OF MAKING HOLLOW RUBBER ARTICLES.
APPLICATION FILED DEC. 7, 1907.
910,370.
Patented Jan. 19, 1909.
2 SHEETS—SHEET 1.
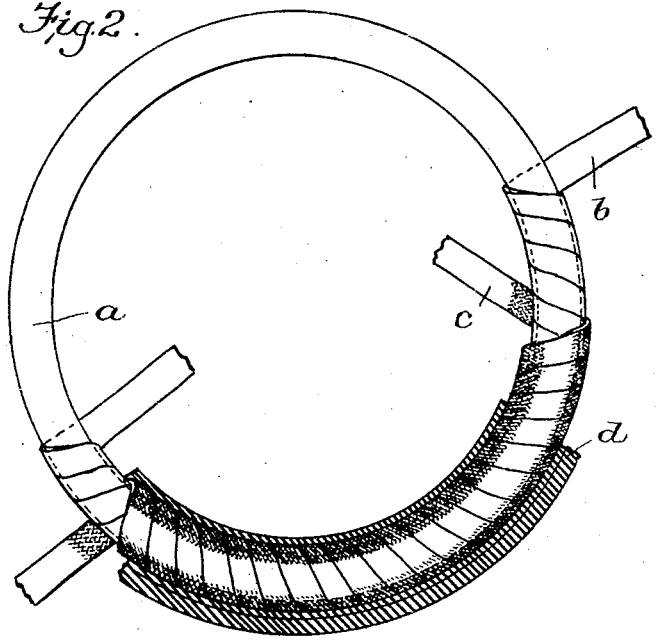
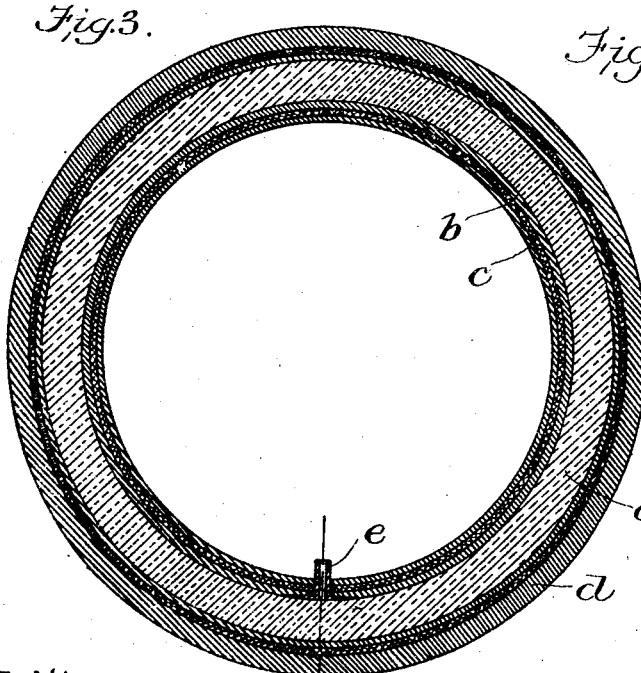
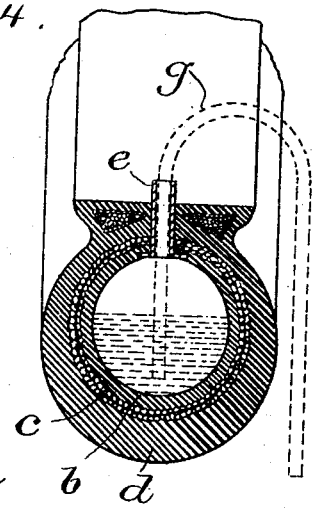
Witnesses.
F. R. Roulstone
P. W. Pezzetti
Inventor:
Frederick J. Gleason
by Wigley Brown Dunby May
Atty F. J. GLEASON.
PROCESS OF MAKING HOLLOW RUBBER ARTICLES.
APPLICATION FILED DEC. 7, 1907.
910,370.
Patented Jan. 19, 1909.
2 SHEETS—SHEET 2.
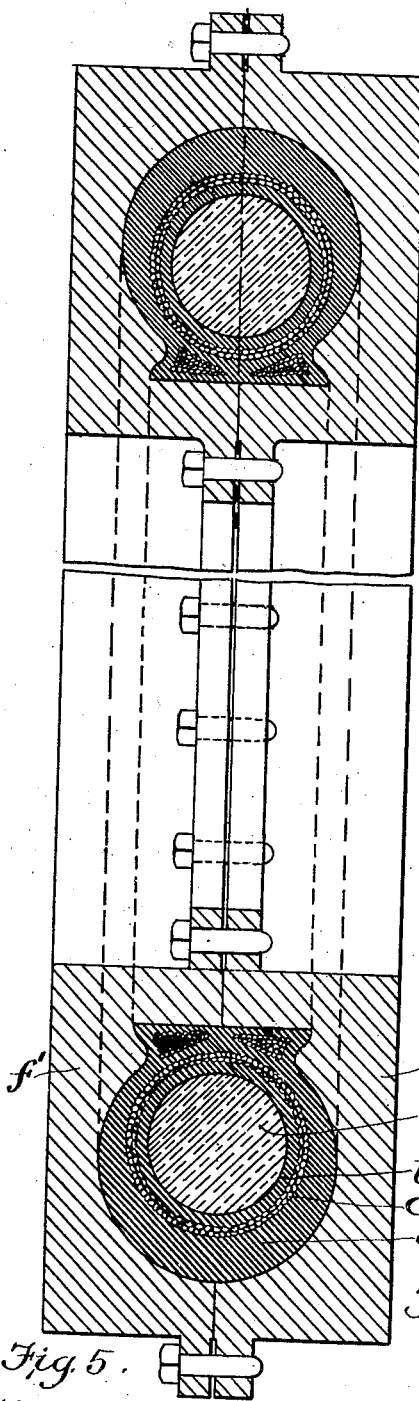
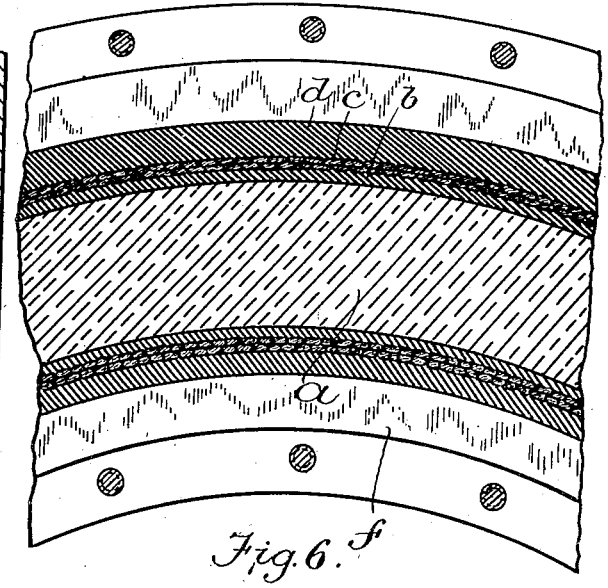
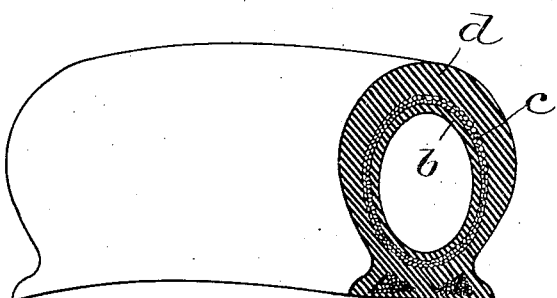
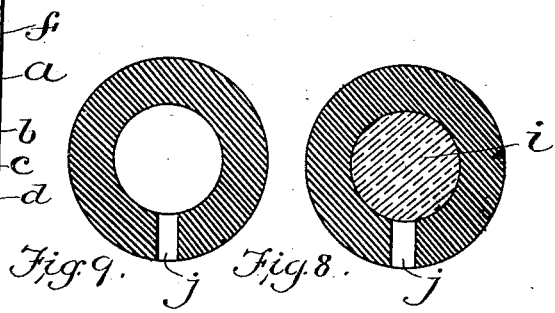
Witnesses:
Inventor:
Frederick J. Gleason

UNITED STATES PATENT OFFICE.

FREDERICK J. GLEASON, OF WALPOLE, MASSACHUSETTS, ASSIGNOR OF ONE-HALF TO ALVI T. BALDWIN, OF BUFFALO, NEW YORK.

PROCESS OF MAKING HOLLOW RUBBER ARTICLES.

No. 910,370.  Specification of Letters Patent.  Patented Jan. 19, 1909.

Application filed December 7, 1907. Serial No. 405,507.

*To all whom it may concern:*

Be it known that I, FREDERICK J. GLEASON, of Walpole, in the county of Norfolk and State of Massachusetts, have invented certain new and useful Improvements in Processes of Making Hollow Rubber Articles, of which the following is a specification.

This invention has relation to the manufacture of hollow goods of vulcanized rubber, such as vehicle tires, hollow cushions for billiard tables, hose pipe, balls, and the like, and has for its object an improved method of making such articles so that they shall be seamless when finished.

I have found that rubber can be cured or vulcanized while in contact with fusible materials which melt at the same or at a lower temperature than the curing or vulcanizing temperature of rubber, without injuring the rubber, and hence in the manufacture of hollow rubber articles, I employ a fusible core or mandrel, which when cold, serves as a form about which the articles may be shaped, and which becomes molten at a desired temperature so that it may easily be withdrawn from the interior of the article, leaving the latter without a seam or joint. I preferably employ for the formation of the mandrel, a material or compound which gives off no gases or vapors when melting, and which fuses without ebullition. Metals are preferable for this purpose, and I have found that certain alloys of bismuth, tin and lead may be used to great advantage, as they melt at any desired temperature, according to the proportions of the ingredients, say from 200 to 280° Fahrenheit.

In accordance with my invention, I form a core or mandrel of suitable material, wrap or place around it the rubber or rubber compound to be vulcanized into the desired article and subject it in this condition to the vulcanizing heat and pressure in any suitable vulcanizing apparatus. The article is naturally placed in a mold which is heated, the heat reaching the mandrel by conduction, and effecting the vulcanization of the rubber article. When the temperature is high enough, the core or mandrel becomes molten, and after the vulcanization is completed, the molten core or mandrel is withdrawn from the article, after the latter has been removed from the molds, by any suitable means.

In manufacturing a vehicle tire, I provide it with a valve tube which is vulcanized in place and through which the molten mandrel may be withdrawn practically in liquid form. In manufacturing other articles, they are punctured at a convenient place and the material, forming the mandrel, is withdrawn or forced out.

On the accompanying drawings, I have illustrated the steps in manufacturing a bicycle tire in accordance with my invention.

Figure 1 represents in section a mandrel formed of suitable material. Fig. 2 represents how the layers of rubber, canvas and the like, may be laid or wrapped about the mandrel. Fig. 3 represents a section through the tire prior to removing the material of which the mandrel is composed. Fig. 4 illustrates how the material, forming the mandrel, may be withdrawn from the interior of the tire by a siphon. Fig. 5 represents the tire placed in the molds ready for vulcanizing. Fig. 6 represents a section through the same. Fig. 7 represents a portion of a finished tire. Fig. 8 represents a rubber ball with a fusible mandrel therein, the ball and mandrel being shown in section. Fig. 9 represents the finished ball.

I desire to have it understood at the outset that the invention is not limited to the manufacture of any particular article, since it may be employed for manufacturing all sorts of hollow rubber articles, that the phraseology which I employ in the specification and claims is for the purpose of description and not of limitation, and that the process or method which I shall describe in detail may be carried out in other ways than those illustrated and described without departing from the spirit and scope of the invention.

Referring to the drawings, *a* represents an annular mandrel which is circular in cross-section. This mandrel, as previously indicated, is made of a material or compound which will melt at a relatively low temperature without giving off gases and without ebullition. Preferably, I form this mandrel or core of an alloy of tin, bismuth and lead in the proportion of five (5) parts by weight of bismuth, three (3) parts by weight of tin and two (2) parts by weight of lead. An alloy of this character will melt at approximately from 199° to 201° Fahrenheit. About the mandrel, I place layers of rubber and canvas or other material which may be utilized to strengthen the tire or to render it puncture proof.

On account of the relatively low melting point of the mandrel, I find it desirable in some cases, to employ, as the first wrapping or layer, a strip of rubber which has been previously cured or vulcanized. The other layers of rubber or rubber compounds are preferably green or uncured. In Fig. 2, the first layer, which is of vulcanized rubber, is indicated at $b$. The second layer, indicated conventionally at $c$, is formed of canvas and about these are placed as many more layers indicated conventionally at $d$ of rubber or rubber and canvas as may be found desirable. After the mandrel has been completely inclosed, as illustrated in Fig. 3, there being inserted, as at $e$, a steel tube which will serve as a valve tube, the mandrel with its inclosing wrapping is placed in molds indicated at $ff'$ in Fig. 5. It will be understood, of course, that the molds are properly formed to give the desired exterior shape to the tire. The molds are then placed in any suitable vulcanizing press where they are subjected to the desired heat. Rubber is vulcanized at approximately 280° Fahrenheit, and as the heat works inward, as it were, into the tire, the vulcanization takes place from the exterior inward. The molds are of course subjected to great pressure as ordinarily. The heat to which the molds are subjected is sufficient to melt the material forming the mandrel $a$, so that, when the vulcanized tire is removed from the molds, the material forming the mandrel is in a molten condition so that it may be withdrawn from the interior of the tire by any suitable means.

I have shown in Fig. 4 how a siphon may be utilized to withdraw the metal which does not run out freely when the tire is arranged upright. The siphon is indicated by dotted lines at $g$ and fits loosely within the steel valve tube $e$. The same material may be then run into molds so as to be shaped again into mandrel form. A complete tire, of which a section is shown in Fig. 7, is formed in this way without joint or seam, and is practically impervious to air so that there is no danger whatever of the leakage of the air which is subsequently compressed therein.

It is evident, as previously indicated, that other articles may be made in substantially the same way. For instance, in Figs. 8 and 9, I have shown how rubber balls may be molded and vulcanized about a mandrel or core, such as indicated at $i$. In this case, of course, the core is spherical in its solid form and may be easily withdrawn through an aperture formed in the ball as at $j$ in Fig. 9.

So far as I am aware, I am the first to have employed in the manufacture of hollow articles of vulcanized rubber, a fusible mandrel which is solid before the article is subjected to the curing or vulcanizing process and which becomes sufficiently fluid, when heated, to be withdrawn. I employ the alloy, previously referred to, in the proportions given, for the reason that it melts at a lower temperature than that of boiling water, and consequently, in the event that any of the metal sticks to the interior wall of the article, I have merely to fill the article with boiling water to effect the melting of the metal and its removal from the wall. Of course, in lieu thereof, I may employ any other material which melts at a point below a temperature which is destructive to the article being made.

I claim:—

1. The herein described method of making seamless, hollow articles of vulcanized rubber, which consists in forming the article of vulcanizable material about an initially-solid core fusible below a temperature destructive to the article, subjecting the article to vulcanization, and withdrawing the core in molten condition.

2. The herein described method of making seamless, hollow articles of vulcanized rubber, which consists in forming the article of vulcanizable material about an initially-solid core consisting of a metallic alloy fusible below a temperature destructive to the article, subjecting the article to vulcanization, and withdrawing the core in molten condition.

3. The herein described method of making seamless vulcanized rubber tubes, which consists in forming a tubular structure of vulcanizable material about an initially-solid mandrel or core of material fusible below a temperature destructive to the article, vulcanizing the tube thus formed, and withdrawing the mandrel in molten condition.

4. The herein described method of making seamless vulcanized rubber tubes, which consists in forming a tubular structure of vulcanizable material about an initially-solid mandrel or core of a metallic alloy fusible below a temperature destructive to the article, vulcanizing the tube thus formed, and withdrawing the mandrel in molten condition.

5. The herein described method of making seamless vulcanized rubber tires, which consists in forming an endless tubular structure of vulcanizable material about an endless initially-solid mandrel or core of fusible material, vulcanizing the tire thus formed, and withdrawing the mandrel in molten condition.

6. The herein described method of making seamless vulcanized rubber tires, which consists in forming an endless tubular structure of vulcanizable material about an endless initially-solid mandrel or core of fusible metallic alloy, vulcanizing the tire thus formed, and withdrawing the mandrel in molten condition.

In testimony whereof I have affixed my signature, in presence of two witnesses.

FREDERICK J. GLEASON.

Witnesses:
　MARCUS BILLAY,
　ARTHUR H. BROWN.